A. L. LAMAR.

KEROSENE VAPORIZER.

APPLICATION FILED MAR. 23, 1918.

Reissued Aug. 13, 1918. 14,501.

INVENTOR

Alexis L. Lamar

BY

G. C. Ulman HIS ATTORNEY

UNITED STATES PATENT OFFICE.

ALEXIS L. LAMAR, OF PITTSBURG, KANSAS, ASSIGNOR, BY DIRECT AND MESNE ASSIGNMENTS, TO CHARLES F. DIKE, OF JOPLIN, MISSOURI.

KEROSENE-VAPORIZER.

14,501. Specification of Reissued Letters Patent. Reissued Aug. 13, 1918.

Original No. 1,222,548, dated April 10, 1917, Serial No. 109,437, filed July 15, 1916. Application for reissue filed March 23, 1918. Serial No. 224,348.

*To all whom it may concern:*

Be it known that I, ALEXIS L. LAMAR, a citizen of the United States, residing at Pittsburg, (address 114 W. Monroe street,) in the county of Crawford and State of Kansas, have invented certain new and useful Improvements in Kerosene-Vaporizers; and I do hereby declare the following to be a full, clear, and exact description of the invention, such as will enable others skilled in the art to which it appertains to make and use the same.

This invention relates to vaporizers, and more particularly to a vaporizer for an internal combustion engine.

The principal object of the invention is the provision of a device of the above stated character, whereby the liquid fuel such as kerosene, gasolene, alcohol, etc., is efficiently vaporized so as to produce a highly combustible mixture of fuel and air.

Another object of the invention is the provision of a device embodying an intake manifold having an exhaust manifold arranged therein, whereby the heat of the exhaust gases from the engine will be sufficient to completely and readily vaporize the kerosene passing through the intake manifold.

A further object of the invention is the formation of heat conducting pins on the interior surface and exterior surface of the exhaust manifold, whereby a greater transfer of heat may be accomplished.

A further object of the invention is the provision of means for introducing gasolene into the intake manifold for an initial starting of the engine.

And a still further object of the invention is the provision of means for introducing a stream of water of any preferred size within the intake manifold.

With these and other objects in view as will appear as the description proceeds, the invention comprises the various novel features of construction, combination and arrangement of parts as will be more fully described hereinafter and set forth with particularity in the appended claims.

Referring to the drawings.

Similar characters of reference are used to denote like parts throughout the accompanying drawings and the following description.

Figure 1:
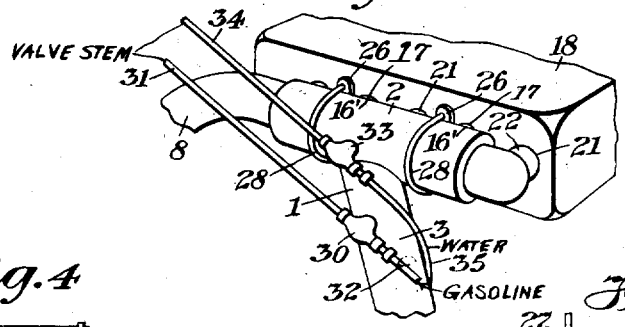
Figure 1 is a detail perspective view of my improved kerosene vaporizer attached to an ordinary four cylinder engine block.
Figure 4:
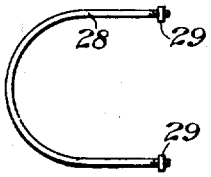
Fig. 4 is a detail elevation of a portion of the attaching means.
Figure 5:
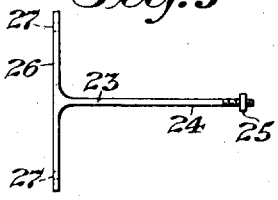
Fig. 5 is a detail elevation of the remaining portion of the attaching means.
Figure 2:
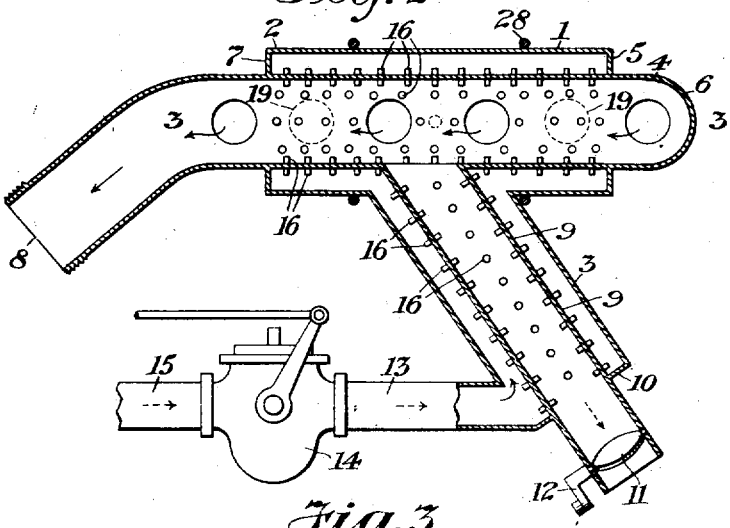
Fig. 2 is a vertical longitudinal sectional view through the vaporizer, showing a conventional form of kerosene carbureter attached thereto.
Figure 3:
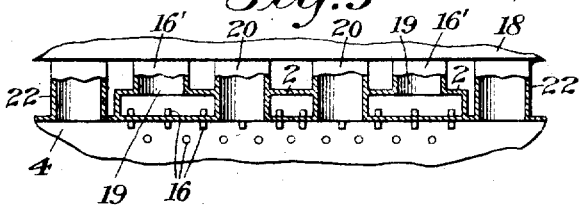
Fig. 3 is a horizontal sectional view taken on line 3—3 of Fig. 2.

Referring more particularly to the drawings, my improved vaporizer is shown to consist of an air and fuel intake manifold 1, which comprises in this instance, a horizontally disposed cylindrical manifold pipe 2, which has an inclined extension 3 that extends downwardly below the manifold pipe 2 at an acute angle thereto.

Disposed longitudinally through the intake manifold 2 is an exhaust manifold 4 which projects beyond the end 5 of the intake manifold a suitable distance where the end is closed, as clearly indicated by the reference numeral 6. The opposite end of the exhaust manifold extends beyond the opposite end 7 of the intake manifold a suitable distance and then extends downwardly at an angle to form the main exhaust outlet 8. A suitable pipe, not shown, is connected to said main exhaust outlet and leads to the muffler of the engine. The exhaust manifold 4, which is horizontally disposed through the intake manifold is provided with a branch pipe 9 which extends downwardly through the center of the extension 3 of the intake manifold. This branch pipe 9 extends through the inclined intake pipe 3 to a point beyond the end 10 thereof.

A butterfly valve 11 is arranged in the branch exhaust pipe 9 below the lower end 10 of the intake manifold and is provided with a bell crank arm 12 to which may be connected a pull rod, not shown, whereby the butterfly valve 11 may be opened to allow a desired portion of the exhaust gases to exhaust through branch pipe 9 to the atmosphere. Extending rearwardly from the extension 3 of the intake manifold at an acute angle thereto is a horizontal intake pipe 13, which in this instance, is formed integral with the section 3. Any suitable or well known form of carbureter, such as conventionally shown and indicated by 14, may be used and connected to the intake pipe extension 3. Connected to this carbureter 14 is a supply pipe 15 which leads to the carbureter from any suitable source of supply, not shown.

The horizontally disposed portion of the exhaust manifold arranged within the intake manifold 2, and the angularly and downwardly extending extension 9 arranged within the extension 3, are formed with heat conducting pins 16 on the outer and inner surfaces of the manifolds.

While I have shown these heat conducting pins formed and arranged on both the inner and outer surfaces of the exhaust manifold pipes, I desire to have it understood that if desired, they may be formed and used on either one of the inner or outer surfaces of the exhaust manifold pipes or may be omitted.

The horizontally disposed intake manifold is formed with nipples 16′ that are designed to seat within the intake openings 17 of the engine cylinders 18. These nipples are provided with outlet openings 19, through which vaporized gases enter the engine.

The exhaust manifold pipe 4 is formed with nipples or extensions 20 that extend through the intake manifold 2 and communicate with the interior of the exhaust manifold 4. These nipples 20 are also seated in the exhaust openings 21 of the engine cylinders 18. Additional nipples 22 are formed integral with the exhaust manifold 4 at points beyond and adjacent the opposite ends of the intake manifold 2, and likewise have their outer ends seated within the exhaust openings 21 of the engine cylinders.

In order to attach my improved kerosene vaporizer to the engine cylinders, I employ in this instance, T bolts 23 that have the outer ends of the stems 24 threaded and passed through bores formed between the cylinders of the engine and are secured therein by the nuts 25 threadedly connected to their ends. Each of the T-bolts 23 is formed with a head 26 having perforations 27 at its opposite end and through which are designed to pass the threaded ends of U-bolts 28, which latter are secured in place by nuts 29 threadedly connected to the ends of the U-bolts.

While I have shown two of these fastening or securing means, in Fig. 1 of the drawings, it is to be understood that any desired number of these securing means may be employed to rigidly and firmly hold the vaporizer in position.

Tapped into or threadedly connected with the intake manifold extension 3 is a valve 30 which is provided with a valve stem 31 that is designed to extend upwardly to the automobile dash within easy reach of the driver. Connected to this valve 30 is a gasolene pipe 32. By the use of this valve an initial supply of gasolene may be allowed to enter the intake manifold to give the engine an initial start. In starting the engine, gasolene is admitted through this valve 30 on which to run the motor until the exhaust pipe has become sufficiently heated by the passage of the burnt gases therethrough, to thoroughly vaporize the air and kerosene mixture that is being sucked into the intake manifold from the carbureter 14. When the exhaust pipes have become sufficiently heated to thoroughly vaporize the kerosene, the valve 30 is closed, whence it will be seen that the engine will run entirely upon the kerosene vapor or gas.

A valve 33 is tapped into or threadedly connected to the intake manifold 2 and is provided with a valve stem 34 that extends upwardly to the dash of the automobile within easy reach of the operator. A water pipe 35 is connected to this valve which leads to the valve from any suitable source of supply. By the provision of this valve 33, it will be apparent that a stream of water of any desired size may be introduced into the intake manifold or the vaporizer, where it will be instantly converted into steam for commingling with the vaporized kerosene and hot air. This steam will not only help to more thoroughly vaporize the kerosene within the intake manifold but will to a great extent assist in the removal of any carbon that may be within the engine cylinder and also prevent the rapid accumulation of carbon in the cylinders.

In operation of the device for starting, the usual cranking of the engine by hand or other desired means, will produce the usual suction through the intake passage, thus drawing air through inlet 15, carbureter 14, horizontal intake pipe 13, inclined intake extension 3, intake manifold 2 and intake passages 19—19 leading to the cylinders of the engine. The draft current thus induced will be mixed with liquid fuel spray, vapor and gas in its passage through the carbureter 14 after the manner characteristic of such devices. If the liquid fuel in the carbureter is kerosene or other hydrocarbon of insufficient volatilizing quality, or if the carbureter is inefficient or the weather too cold, the liquid fuel in the air draft may not be diffused, subdivided or gasified sufficiently to give an explosion when subjected to the igniting spark in the cylinder of the engine. In such case the valve 30 may be opened sufficiently to permit a desired amount of gasolene to enter the intake manifold. The gasolene being far more volatile than the kerosene will be more or less vaporized and gasified, thus enriching or "priming" the intake air with a more readily combustible constituent.

The intake draft mixture being primed by the gasolene supplied through valve 30, or in any other desired way will then reach the cylinders in the explosive condition, so that the engine will start and will take up its usual cycle of operation.

Any excess gasolene or kerosene falling on the inclined wall of extension 3 will flow down to the point of its acute angle junction with horizontal intake pipe 13 where it will naturally fall by gravity into the center of the in-rushing air draft. The acute angle deflection of the draft at this point, as also the deflections at other points in the intake passage, will cause drops of liquid fuel too large for explosive combustion to be projected against the walls of the intake passages at each bend or obstruction. Such drops naturally drain back down the inclined trough formed by the lower wall of the intake 3 and are repeatedly subjected to the incoming draft until ultimately vaporized or broken up into very fine particles or else be drained back into the carbureter through pipe 13. Thus the inclination of extension pipe 3 and its acute angle relation to horizontal intake 13 results in carbureting, mixing and drying the intake draft mixture.

At this time or previously, the cut out valve 11, will be opened so as to permit free discharge of the exhaust through the auxiliary or branch exhaust pipe 9. When the engine has been run sufficiently to cause the burnt exhaust gases to heat the exhaust manifold to the required degree, the heat thus applied will be sufficient to readily and quickly vaporize the kerosene content of the intake draft which has been supplied to it by the carbureter 14. When this happens, the valve 30 is closed, thus cutting off the supply of gasolene and permitting the motor to run entirely on the air and kerosene mixture that is being sucked in from the carbureter.

During the operation of the device, the auxiliary exhaust valve 11 affords a means for controlling the heating effect of the exhaust manifold on draft mixture in the surrounding intake manifold and under normal conditions of operation, when the weather is not too cold, the liquid fuel not too low grade or the carbureter not too inefficient, said valve 11 may be kept nearly or quite closed. This is an important feature since, as is well known in the art of kerosene carburation, it is very undesirable to expose the intake draft to a temperature which will distil or "crack" the kerosene or to a temperature which will too greatly rarefy the air and thus decrease the total quantity of air and combustible which will be drawn into the cylinders of the engine. Even with the valve 11 completely shut off, the branch exhaust 9 will be heated by conduction so as to be quite hot at the upper end and progressively cooled toward the intake at the lower end, so that the entering mixture of air and liquid fuel will proceed continuously from cooler to hotter regions and will find no intermediate cooling spots where recondensation of the liquid fuel could occur.

Whenever found desirable for hill climbing or other special conditions, the valve 11 may be opened so as to allow the exhaust gases to pass freely through branch pipe 9. This will quickly heat it to a temperature which will cause more effective vaporizing of the kerosene.

Thus it will be seen that a complete and efficient carbureting of the intake draft may be had in operation of the device by the heat derived from the exhaust gases passing either through the main exhaust pipe alone, or partly through it and partly through the auxiliary branch exhaust 9, according as conditions may require.

While the intake manifold constituting my present invention has been mainly employed by me in connection with a well known type of carbureter designed for gasolene, but using kerosene as a fuel, it will be readily understood that any known or desired form of carbureter may be employed and that while kerosene is one of the typical, cheap, universally obtainable liquid fuels, usable for such purposes, the above described construction and functioning of the manifold may be usefully employed where other suitable liquid fuels such as alcohol, gasolene, etc., are used. It will be obvious also that the principal functions of the intake manifold, the auxiliary exhaust, and the valve for controlling circulation through the latter, may be usefully employed even where the above described expedients for injecting supplemental supplies of water and gasolene in the manifold, are omitted.

I claim:

1. An engine manifold comprising an intake manifold consisting of a horizontally disposed manifold pipe, and an extension pipe extending downwardly from the horizontal section, a hydrocarbon intake pipe connected to the lower end of said depending extension, said intake manifold being provided with outlet openings, an exhaust manifold disposed through and within the intake manifold in spaced relation to the walls thereof, an exhaust pipe extension disposed through and in spaced relation to the walls of the depending section of the intake manifold, and a valve arranged in the lower end of said exhaust pipe extension adapted to control the heat transmitting efficiency of the exhaust manifold within the intake manifold.

2. An engine manifold comprising an intake manifold having outlet openings therein, an extension pipe projecting from said intake manifold, a hydro-carbon supply pipe connected to said extension, an exhaust manifold disposed through and in spaced relation to the walls of the intake manifold inlet, arms projecting laterally from the exhaust manifold through said intake manifold, and exhaust pipe extension extending through and in spaced relation to the walls of the intake extension, and heat transmitting means carried by said exhaust manifold and exhaust extension pipe.

3. An engine manifold comprising an intake manifold, consisting of a horizontally disposed manifold, and an extension pipe extending downwardly from said horizontal manifold, a hydrocarbon intake pipe connected to the lower end of said depending extension, said intake manifold being provided with outlet openings, an exhaust manifold disposed through and in spaced relation to the walls of the intake manifold, an exhaust pipe extension disposed through and in spaced relation to the walls of the depending section of the intake manifold, heat transmitting pins disposed on the inner and outer surfaces of the exhaust manifold and the exhaust depending section, and a valve arranged in the lower end of said exhaust pipe depending section, adapted to be actuated to control the heat transmitting efficiency of said exhaust manifold, exhaust depending section, and heat transmitting pins carried thereby.

4. An engine manifold comprising an intake manifold consisting of a horizontally disposed manifold pipe, and an extension pipe extending downwardly from the horizontal section, a hydrocarbon intake pipe connected to the lower end of said depending extension, said intake manifold being provided with outlet openings, an exhaust manifold disposed through and within the intake manifold in spaced relation to the walls thereof and formed with a main exhaust outlet, a branch exhaust pipe extension disposed through and in spaced relation to the walls of the depending section of the intake manifold, and a valve arranged in the lower end of said exhaust pipe extension adapted to afford a variable auxiliary outlet for escape of exhaust gases and thereby to control the heating effect of the exhaust manifold within the intake manifold.

5. An engine manifold comprising an intake manifold consisting of a horizontally disposed manifold pipe, an inclined extension pipe extending downwardly from the horizontal section, an air and fuel intake passage leading into the lower end of said depending extension, said intake manifold being provided with outlet openings adapted to communicate with the cylinders of the engine, an exhaust manifold disposed through and within the horizontal section of the intake manifold in spaced relation to the walls thereof and formed with a main exhaust outlet for one end thereof, a branch exhaust extension disposed through and in spaced relation to the walls of the depending section of the intake manifold and means for permitting and controlling escape of exhaust gases from the lower end of said exhaust pipe extension.

6. An engine manifold comprising an intake manifold consisting of a horizontally disposed manifold pipe, an inclined extension pipe extending downwardly from the horizontal section, an air and fuel intake passage leading horizontally into the lower end of said depending extension, said intake manifold being provided with outlet openings adapted to communicate with the cylinders of the engine, an exhaust manifold disposed through and within the horizontal section of the intake manifold in spaced relation to the walls thereof and formed with a main exhaust outlet for one end thereof, a branch exhaust extension disposed through and in spaced relation to the walls of the depending section of the intake manifold and having an auxiliary exhaust outlet at the lower end thereof.

7. An engine manifold comprising an intake manifold and an exhaust manifold, one of said manifolds being disposed through and within the other manifold in spaced relation to the walls thereof, said intake manifold consisting of a horizontally disposed manifold pipe, an inclined extension pipe extending downwardly from the horizontal section at an acute angle thereto, an air and fuel intake passage leading to the lower end of said depending extension at an acute angle thereto, said intake manifold being provided with outlet openings adapted to communicate with the cylinders of the engine, and said exhaust manifold consisting of a horizontally disposed manifold pipe provided with a main exhaust outlet and disposed in spaced relation to the walls of the intake manifold, a branch exhaust extension disposed in spaced relation to the walls of the depending section of the intake manifold, and a valve arranged in the lower end of said exhaust pipe extension adapted to afford a variable auxiliary outlet for escape of the exhaust gases and thereby to control the heating effect of the exhaust manifold upon the intake manifold.

8. An engine manifold comprising an intake manifold and an exhaust manifold, one of said manifolds being disposed through and within the other manifold in spaced relation to the walls thereof, said intake manifold consisting of a horizontally disposed manifold pipe, an inclined extension pipe extending downwardly from the horizontal section, an air and fuel intake passage leading to the lower end of said depending extension at an acute angle thereto, said intake manifold being provided with outlet openings adapted to communicate with the cylinders of the engine, and said exhaust manifold consisting of a horizontally disposed manifold pipe provided with a main exhaust outlet and disposed in spaced relation to the walls of the intake manifold, a branch exhaust extension disposed in spaced relation to the walls of the depending section of the intake manifold and means for permitting and controlling escape of exhaust gases from the lower end of said exhaust pipe extension.

9. An engine manifold comprising an intake manifold and an exhaust manifold, one of said manifolds being disposed through and within the other manifold in spaced relation to the walls thereof, said intake manifold consisting of a horizontally disposed manifold pipe, an inclined extension pipe extending downwardly from the horizontal section, an air and fuel intake passage leading to the lower end of said depending extension at an acute angle thereto, said intake manifold being provided with outlet openings adapted to communicate with the cylinders of the engine, and said exhaust manifold consisting of a horizontally disposed manifold pipe provided with a main exhaust outlet and disposed in spaced relation to the walls of the intake manifold, a branch exhaust extension disposed in spaced relation to the walls of the depending section of the intake manifold and having an auxiliary exhaust outlet at the lower end thereof.

Signed at Pittsburg, county of Crawford and State of Kansas, this 19th day of March, 1918.

ALEXIS L. LAMAR.